US006529186B1

(12) United States Patent  (10) Patent No.: US 6,529,186 B1
Thayer  (45) Date of Patent: Mar. 4, 2003

(54) METHOD AND SYSTEM FOR INDEX FINGER CONTROLLED POINTING DEVICE POSITIONED ON HOME ROW KEYS

(75) Inventor: Paul Thayer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 09/696,756

(22) Filed: Oct. 26, 2000

(51) Int. Cl.$^7$ .................................................. G09G 5/00
(52) U.S. Cl. ....................................... 345/161; 345/156
(58) Field of Search ............................... 345/161, 164, 345/167, 157, 156, 158, 159

(56) References Cited

U.S. PATENT DOCUMENTS

| 4,680,577 | A | * | 7/1987 | Straayer et al. | 345/160 |
|---|---|---|---|---|---|
| 5,521,596 | A | * | 5/1996 | Selker et al. | 341/20 |
| 5,675,361 | A | * | 10/1997 | Santilli | 345/156 |
| 5,689,253 | A | | 11/1997 | Hargreaves et al. | 341/22 |
| 5,694,123 | A | * | 12/1997 | Selker et al. | 341/20 |
| 6,005,496 | A | | 12/1999 | Hargreaves et al. | 341/22 |
| 6,084,572 | A | * | 7/2000 | Yaniger et al. | 345/156 |
| 6,239,786 | B1 | * | 5/2001 | Burry et al. | 341/22 |
| 6,271,834 | B1 | * | 8/2001 | May et al. | 341/22 |
| 6,304,247 | B1 | * | 10/2001 | Black | 345/157 |
| 6,359,613 | B1 | * | 3/2002 | Poole | 345/156 |

FOREIGN PATENT DOCUMENTS

| WO | WO94/24685 | 10/1994 | .......... H01H/13/70 |
|---|---|---|---|
| WO | WO96/39679 | 12/1996 | .......... G06K/11/18 |

OTHER PUBLICATIONS

*IBM Technical Disclosure Bulletin*, "Method for Providing a Removable Pointing Device for the Keyboard", vol. 36, No. 07, Jul. 1993, p. 493.

* cited by examiner

*Primary Examiner*—Vijay Shankar
*Assistant Examiner*—Nitin Patel
(74) *Attorney, Agent, or Firm*—David A. Mims, Jr.

(57) ABSTRACT

The present invention involves a computer based method and system employing an index finger controlled pointing device for manipulation and control of the keyboard. The user employ their index fingers as the pointing device from the home row typing position. All pointing device operations and thumb button operations can proceed without moving either hand from the home row key position. This represents a significant improvement over the current state of the art by keeping the user's hands and fingers in place over the home row of keys on the keyboard. This improved approach is the basis of a major embodiment of this invention.

14 Claims, 4 Drawing Sheets

METHOD AND SYSTEM FOR INDEX FINGER CONTROLLED POINTING DEVICE POSITIONED ON HOME ROW KEYS

TECHNICAL FIELD

The present invention involves improved computer keyboard control techniques. Specifically, this is involved with a computer based method and system which employs an index finger controlled pointing device, for manipulation and control of the keyboard, without moving the fingers away from the "home row of keys" of a computer keyboard.

BACKGROUND OF RELATED ART

Extensive creativity has been applied toward developing means to input x,y coordinate data to a computer. The joystick, mouse, trackball, thumbpad and pen have all been implemented. One recent device is the International Business Machines Corporation (IBM) TrackPoint™, used for IBM Thinkpad™ laptop computers. A computer user applies gentle pressure with an index finger on this device to input x,y coordinate data. The index finger is a natural human pointing device superior to the thumb or hand.

The mini-joystick, like most pointing devices, still requires that the user move his fingers from the "home row" of keys. For touch typists, keeping fingers on the home row of keys (i.e. left hand over keys 'asdf' and right hand over 'jkl;', is fundamental to typing productivity and comfort. Having to move one's hand or finger away from the "home row of keys" is a common frustration against pointer devices. The thumb controlled trackballs and pointer pads can be controlled without moving the fingers from the home row of keys. This contributes to the popularity of thumb-controlled trackballs and pointer pads, which can be controlled without moving the fingers from the home row of keys. However, the thumb is a less natural and precise pointing device than the index finger.

A more ideal solution to this problem would be to use the "index finger" as the pointing device from the home row position. This represents one of several embodiments of the present invention.

In the current art, for example, the finger mini-joystick, locates the device between the bottom of the 'g' and 'h' keys. Once on top of the joystick, the finger presses down gently (to avoid slipping off) and then applies lateral pressure on the joystick "button" to generate x,y coordinate information. To fit the joystick button into a familiar keyboard, the button is made small and tucked in with minimal alteration to existing keys. Either the left or right index finger may be moved (hand shift or finger stretch) about one inch to access the joystick.

To access the joystick from the home row position, the user may shift the entire hand, moving the fingers away from the "home row of keys". Alternately, the user may stretch just an index finger over to access the joystick. When stretching the index finger, an awkward and uncomfortable gesture, toward the joystick, the finger stretching over leaves the home row position. Either technique: (1) hand-shifting, or (2) finger stretching, has not been optimum. The best approach, therefore, would be to keep the user's hands and fingers in place, over the "home row of keys".

SUMMARY OF THE PRESENT INVENTION

The present invention, therefore, involves a computer based method and system employing an index finger controlled pointing device, for manipulation and control of the keyboard. The user employs his index finger as the pointing device from the home row typing position. All pointing device operation and thumb button operation can proceed without moving either hand from the home row of keys position.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

The present invention represents a significant improvement over the current state of the art in the following manner. It keeps the user's hands and fingers in place over the home row of keys on the keyboard. This improved approach is the basis of a major embodiment of this invention.

Position the mini-joystick under the 'j' key and then employ the right index finger, press gently on the 'j' keeping the finger positioned just where it belongs over the home keys. Since the entire concave key surface is available, the user has a larger surface to press on. This larger surface is more comfortable to press on than the smaller joystick button currently available. Because the user need not stretch the index finger or shift the hand, the user can stay comfortable while both typing and pointing; thus reducing keyboard fatigue. It can further reduce the risk of injury to fingers, hands, wrists and arms suffered during repeated keyboarding and pointing activity.

A primary embodiment of the present invention is to employ the 'j' key for double duty. If one presses down the 'j' key first, then a continuous stream of 'j' characters come streaming out onto the computer screen. If the 'j' key is used both as a pointing device and as the 'j' key, it becomes a dual-mode device. This requires that the 'j' key be switched from joystick mode to keystroke mode. For the idea to be useful, the 'j' key mode switching process must be quick, natural and easy to implement.

There are many ways to change the mode of the key. The control key, the alt key, the shift key and the cap-lock keys all are used to change the mode of other keys. Because these mode shifting keys have been around for many years, they are being used extensively for many purposes. Further, accessing these keys requires moving the fingers from the home row. Thus, they should not be used to shift the mode of the 'j' key. The mechanism for mode switching the 'j' key is described below. Thus, the method of mode switching is a primary embodiment of the present invention.

'J' Key Mode Switching

Another embodiment of this invention is based on 'j' key mode switching. It provides for an index finger pointing device without the need to move either the left or right hand fingers away from the home row of keys. Thus, the 'j' key mode switching must occur without either the left or right hands, fingers moving away from the home row of keys. The left index finger hovers over the 'f' key and the right index finger hovers over the 'j' key. Most keyboards make it easy for the user to find these home index keys by molding a small bump on the surface of these keys. Since these two keys are so important to typists and so easy to find, these two keys are used to invoke the mode switch.

The following represents the method to mode switch the 'j' key from keystroke function to a pointing device function and back.

Figure 1:
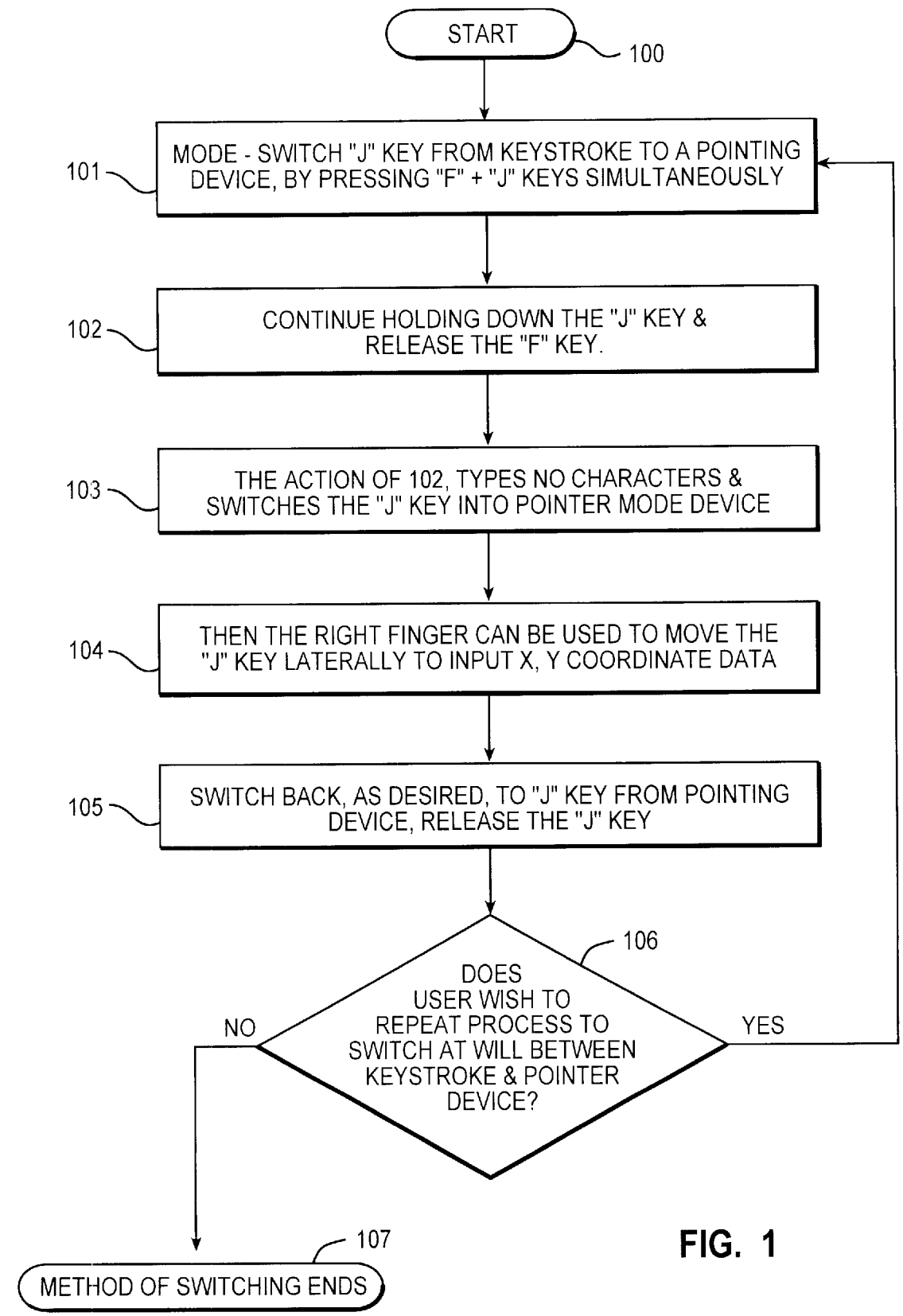
FIG. 1 demonstrates the method of mode switching from 'j' keystroke mode to pointer mode and back to 'j' keystroke mode.

FIG. 1 demonstrates the method of mode switching from 'j' keystroke to pointer and back to 'j' keystroke mode. The method begins at 100. The first step in mode switching the 'j' key from a keystroke to a pointing device is accomplished at 101 by pressing the 'f' and 'j' keys simultaneously. The following step involves holding down the 'j' key and releasing the 'f' key at 102.

The action at 102 does not type any characters, rather it acts, 103, to switch the 'j' key into a pointer mode device. Then, at 104, the right finger can be used to move the 'j' key laterally to input x,y coordinate data. The ability to switch back, 105, as desired to the 'j' key from a pointing device, is accomplished by releasing the 'j' key.

The query can be raised at 106 as to whether the user wishes to again repeat the process to switch at will between the keystroke and pointer device. If the answer is yes, the process is returned to 101 and again repeated. If the answer to 106 is no, then the switching method is ended at 107.

While the 'j' key is depressed and used as a pointer device, all other data keys are available for normal keystroke operations except for the 'j' key, which is unavailable for keystroke operations, as it is being used as a pointer device.

Because the 'f' and 'j' keys are close together, a user could invoke the mode switch with one hand. For example, with the thumb pressing the 'f' key while the forefinger presses the 'j' key, a right-handed user could switch into a joystick mode with one hand. A left-handed person could do the corresponding act.

Algorithm for "J" Key mode Switching.

Since there are few or no known words containing the 'fj' or 'jf' combinations, it is rare that this character combination will be typed other than to invoke a "to joystick" mode switch. However, users will occasionally want to produce an "fj" or "jf" combination, such as in a password code. To distinguish whether the user wants to type 'fj', 'jf' or perform "to joystick" mode switch, a time delay is used. If the 'f' and 'j' keys are pressed simultaneously (within a very short time, such as under 50 milliseconds) this gesture indicates a "to joystick" mode switch. That is, the 'j' key becomes a pointer device, and the 'f' and 'j' characteristics are discarded. If the duration between 'f' and 'j' keys is longer, the character sequence "f j" or "jf" is produced. The duration may be made adjustable to satisfy a variety of users. A default duration of about ⁵⁰⁄₁₀₀₀ths of a second would function well.

Figure 2A:
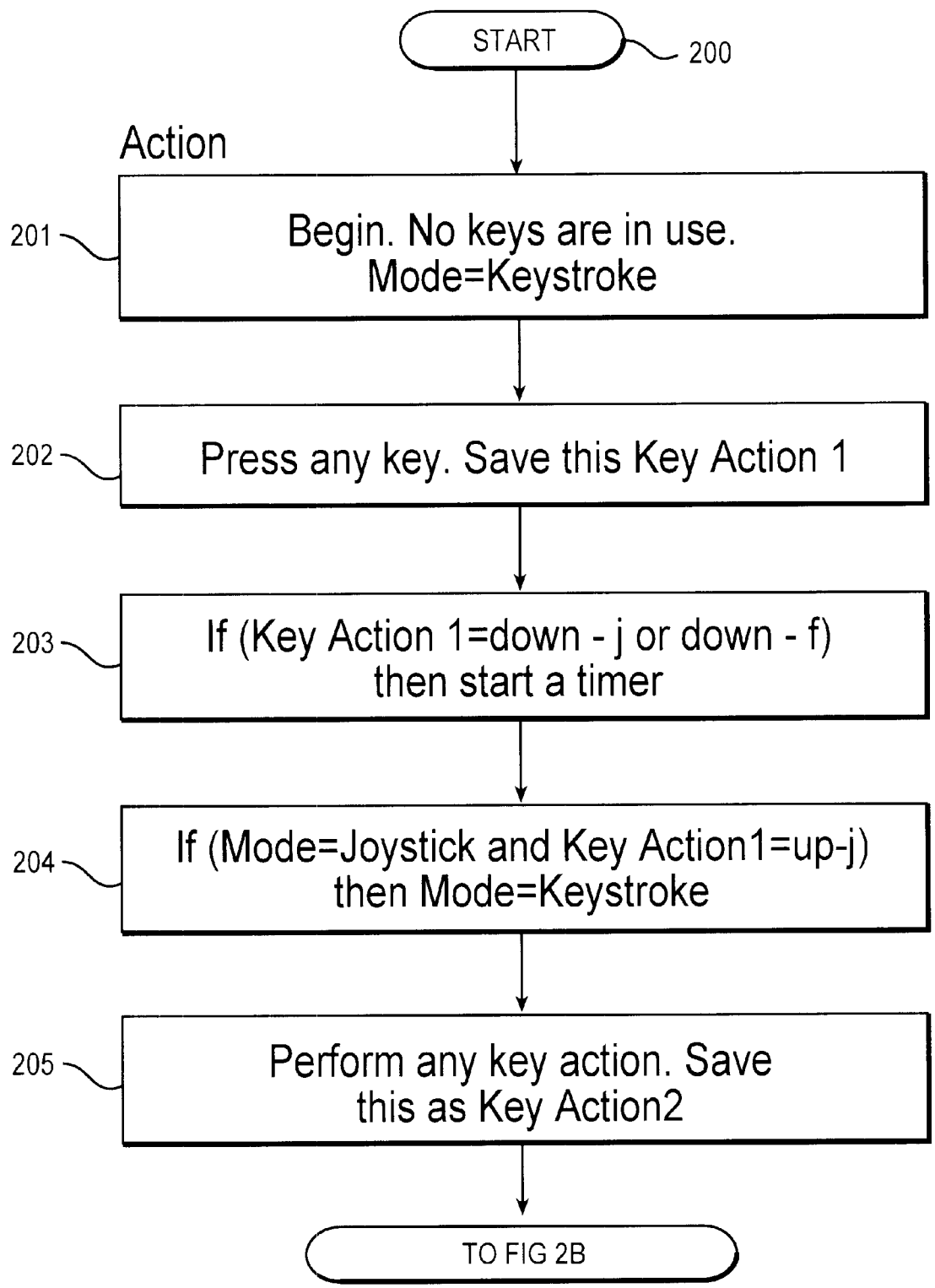
FIGS. 2A and 2B represent the algorithm for the method for mode switching. The details on how the 'f' and 'j' keys can be used to mode switch is fully described below in a step-by-step algorithm.
Figure 2B:
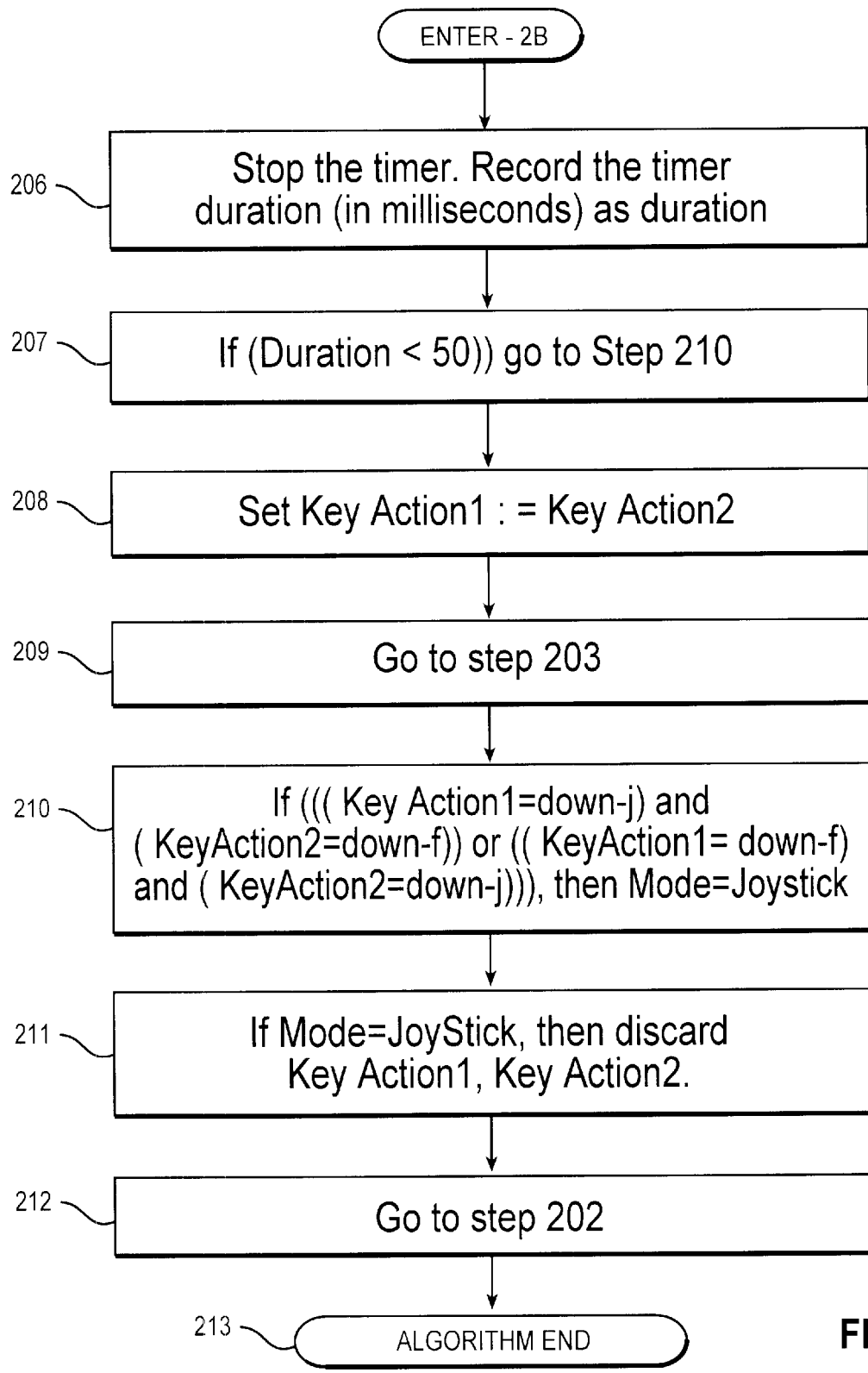

FIGS. 2A and 2B represent the algorithm for the method for mode switching. The details on how the 'f' and 'j' keys can be used to mode switch is described below in a step-by-step algorithm in FIGS. 2A and 2B. When the Mode= Keystroke, all keys on the keyboard, including the 'j' key, produce keystroke characteristics. When the Mode= Joystick, all keys on the keyboard, excluding the 'j' key, produce keystroke characters and the 'j' key behaves as a joystick pointing device. Assume the 'f' key is case insensitive and covers both 'F' and 'f'. Likewise, 'j' covers 'J' and 'j'.

The algorithm provides the means by which new or existing keyboard device drivers, with the introduction of a timer duration measuring capability, can be modified to support the 'j' key mode switch operation. Any computer based on the "IBM PC-AT" standard, contains all the hardware necessary to supply the duration timing capability. The device driver model of popular computer operating systems provides APIs that permit making millisecond accurate timing. These timings can be used in keyboard device drivers to implement the mode switch.

Figure 3:
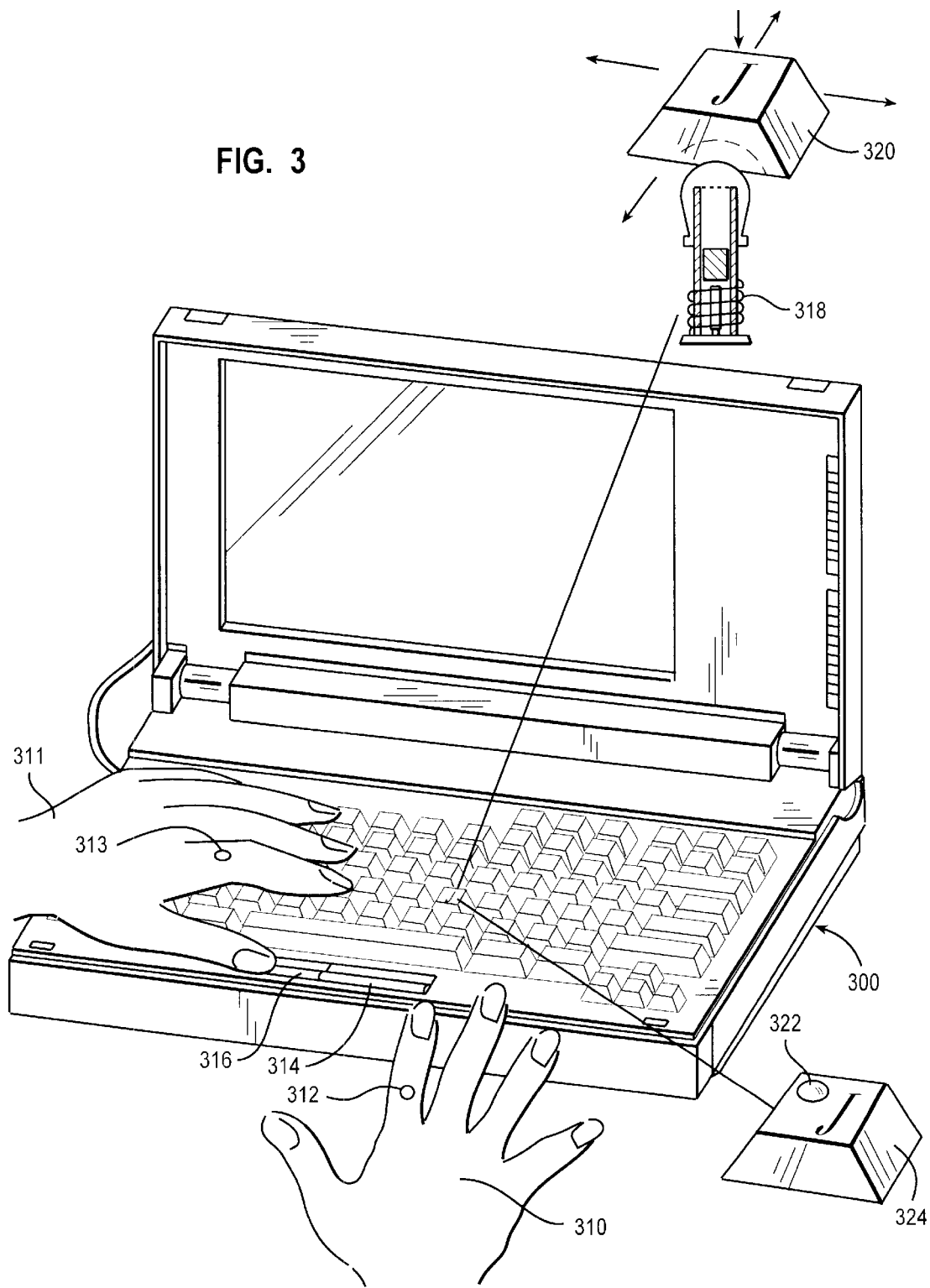
FIG. 3 represents a keyboard for a laptop computer showing the placement of a pointing device capable of being manipulated by the user's index finger.

FIG. 3, shows a keyboard 300 such as the one used in the IBM Thinkpad laptop computer. The IBM Thinkpad laptop computer keyboard 300 contains thumb controlled pointer pads 314 and 316 which may be manipulated by the user's thumbs, In the preferred embodiment, a mini-joystick 318 is positioned under a "J" key 320 which may be manipulated by the user's index finger 312. Alternatively, the joystick 322 may be position on top of the 'j' key 324. The 'j' key 324 with the joystick button 322 may be selected using the index finger 312 of the user's right hand.

Left Handed, Right Handed

Thus far it has been assumed that the computer keyboard user is right handed, which is why the 'j' key was chosen as the new location for the joystick pointing device. For right handed users, using the right index finger on the home row of keys, the 'j' key as a pointing device is very desirable.

For left handed users, the desired index finger may be the index finger on the left hand. In this case, the desired joystick pointer device would be the 'If' key.

The keyboard manufacturer can currently accommodate both left and right hand users by locating the joystick pointer device in the middle of the area between the left index finger and the right index finger. Located in the middle, both right and left-handed users must shift or stretch their index fingers to access the joystick. Everyone is accommodated, but no one has an ideal position.

Another embodiment of the present invention resolves this problem. This involves having two joystick pointing devices: one under the 'f' key and one under the 'j' key. Whichever key, the 'f' or 'j', that continues to be held down after the user presses both the 'f' and 'j' keys simultaneously, that key becomes the active joystick pointing device. Since it would be contrary to the current computer usage to have two pointer devices both active at the same time, the correct solution would be to have only one pointer device active at one time. To use the left index finger as a pointer, press both 'fj' together, and release the 'j' key while continuing to hold down the 'f' key. This mode switch identifies the If, key as the joystick. The above 12 step algorithm may be modified slightly to permit mode switching either the 'f' key or 'j' key, depending upon which key remained depressed after the 'fj' key combination was performed.

Providing two joystick devices instead of one increases the cost slightly. In an alternate method, the apparatus that combines the key and the joystick may be removable. That is, the user could position the joystick under the 'f' key or 'j' key by popping off the keycap, popping out the joystick device, replacing the joystick device where desired, and replacing the keycap where appropriate. Whether two separate fixed joysticks are provided or one repositionable joystick is provided, the cost of the keyboard is slightly increased. However, the result is a keyboard pointing device combination that accommodates both left and right handed users better than any other approach currently available on the market.

Dual Mode, Mechanical

The key or keys that cover the joystick pointing device must provide dual mechanical functions. When the key is in the joystick mode, the key is held down and gently pressed around like the IBM TrackPoint button. It is simple to imagine that the joystick button may be repositioned directly where the 'j' or 'f' key would be, and the key cap affixed onto the top of the joystick button. However, this removes the keystroke function from the key. Rather, the key must provide both keystroke function and joystick function.

One approach is to mount the current joystick on a spring-loaded key base assembly. The base of the assembly may be similar to the current key base: it is fixed, a spring-loaded well that accepts a movable keycap. The moveable keycap is replaced with a mini-joystick assembly. On top of the joystick is affixed the keycap with the letter 'j' or letter 'f'. Such an assembly would provide the keystroke and joystick capability in one unit.

Thumb Button

To serve as left and right mouse buttons, keyboards equipped with a finger mini-joystick usually provide two buttons, provided convenient to the left and right thumbs. The positioning function and use of these "thumb buttons" remains the same with the introduction of the index finger controlled joystick on the home row. All pointing device operation and thumb button operations can be produced without moving either hand from the home row of key positions.

In a further embodiment, the following should also be considered. Earlier it was noted that one hand reaching over the keyboard, activating and operating the mini-joystick pointing device with a single hand is a desirable operation. It was noted that a user could activate the joystick key with one hand by pressing both the 'f' and 'j' keys, then keeping the desired joystick key down with one finger, while releasing the other finger.

However, pressing the 'f' and 'j' keys together was originally intended to be performed with two hands: using the index finger of the left hand to press the 'f' key and using the index finger of the right hand to press the 'j' key. This allows the desired joystick key to be activated without the hands leaving the home row of keys.

Although this gesture is quite suitable using only one hand, some specific users may find this gesture not to their liking. Since some users may not like to press both the 'f' and 'j' key down with two fingers from the same hand.

Thus, another embodiment of this invention is an alternate approach to address this point and is represented by a more convenient gesture as follows:

Let the activation keys for the right joystick key (the 'j' key) be the 'j' and 'k' keys. Thus, the user can reach over with one hand and press the 'j' and 'k' keys down together, then release the 'k' key while continuing to hold down the 'j' key with the right index finger. This gesture switches the 'j' key into the joystick mode. This gesture can be performed comfortably with one hand, preferably the right hand. Using the index finger of the right hand to press down the 'j' key while simultaneously using the next finger to the right of that index finger (the middle finger of the right hand) to press the 'k' key is a quick, comfortable gesture that can be performed with one hand while keeping the fingers in the home row of keys position. This gesture, using the index and middle fingers of the right hand to press the 'j' and 'k' keys together, then releasing the 'k' key, mode switches the 'j' key from a keystroke key into a mini-joystick pointing device key. To mode switch the 'j' key back into a keystroke key, just release the 'j' key.

A similar gesture for the left hand follows: let the activation keys for the left joystick key (the 'f' key) be the 'd' and 'f' keys. Thus, the user can reach over with one hand and press the 'd' and 'f' keys down together; then release the 'd' key while continuing to hold down the 'f' key with the left index finger. This gesture switches the 'f' key into the joystick mode. This gesture can be performed comfortably with one hand, preferably the left hand.

The gestures above resolve any possible awkwardness that some users might encounter in activating the joystick mode with one hand. Also, these gestures achieve the goal of allowing the fingers to remain in the home key position while activating and using the pointer device.

The location of the mini-joystick pointing device(s) under the 'f' and/or 'j' key may prevent the user from realizing that there is a pointing device available on the keyboard. This may cause frustration as the user is looking for the familiar red-capped "eraser head" joystick pointing device typically centered between the 'g', 'h' and 'b' keys. To aid the user in discovery that the 'f' and 'j' keys contain a special ability, it is recommended that the font used to print the letter 'f' on the 'f' key and the letter 'j' on the 'j' key, be different from the font used to print the letters of the other keys. For example, the 'f' on the 'f' key may be printed in a bolder, darker, thicker font. Similarly with the 'j' on the 'j' key. To indicate the special relationship between the 'd' and 'f' keys, the 'd' key could be printed with a 'D-' and the 'f' key printed with a '-F' [bold F]. Similarly, to indicate the special relationship between the 'j' and 'k' keys, perhaps the 'j' key could be printed with a 'J-' [bold J] and the 'k' key printed with a '-K' . The "special relationship" is the two-finger, one-handed joystick-key activation gesture described above.

The introduction of the IBM TrackPoint pointing device has been highly successful. The present invention described herein extends the value of the original joystick device by allowing it to be used without moving one's fingers or hands. This is accomplished by moving it under a key or keys that hide the joystick, while increasing its ease of use, reducing finger, hand, wrist and arm fatigue experienced by keyboard users.

While the invention has been shown and described with reference to particular embodiments thereof, it will be understood by those skilled in the art that the foregoing and other changes in form and detail may be made therein without departing from the spirit and scope of the invention.

What is claimed is:

1. A computer based method employing an index finger controlled pointing device, for manipulation and control of the computer keyboard, consisting of the steps of:

employing user's said index finger for inputting x,y coordinate data into a computer;

as said pointing device, by means of a joystick(s);

placed on top of or under specific keyboard letters;

keeping said user's hands and fingers over the home row of keys position, throughout the process;

employing a mini-joystick positioned either under or on the 'j' key of said keyboard;

employing the right index finger to press on said 'j' key, while keeping the finger positioned just over said home keys;

switching the 'j' key function from a key to an index finger pointing device without the need to move either the left or right hand fingers away from the home row keys by having said left index finger hover over the 'f' key;

and the right said index finger hovers over the 'j' key;

said left index finger hovers over said 'f' key and said right index finger hovers over the 'j' key;

employing said switching mode consisting of said switching mode switching from 'j';

keystroking to said pointer and back to 'j' keystroke mode by pressing the 'f' and 'j' keys simultaneously, holding down the 'j' key and releasing said 'f' key, switching said 'j' key into a pointer mode device, and using said right finger to move the 'j' key laterally to input x,y coordinate data and switching back to the 'j' key from a pointing device, releasing the 'j' key.

2. A computer based method employing an index finger controlled pointing device, for manipulation and control of the computer keyboard, consisting of the steps of:

employing use's said index finger for inputting x,y coordinate data into a comuter;

as said pointing device, by means of a joystick(s);

placed on top of or under specific keyboard letters;

keeping said user's hands and fingers over the home row of keys position, throughout the process;

employing a mini-joystick positioned either under or on the 'j' key of said keyboard;

employing the right index finger to press on said 'j' key, while keeping the positioned just over said home keys;

switching the 'j' key function from a key to an index finger pointing device without the need to move either the left or right hand fingers away from the home row keys by having said left index finger hover over the 'f' key;

and the right said index finger hovers over the 'j' key;

said left index finger hovers over said 'f' key and said right index finger hovers over the 'j' key;

invoking said keystroke mode switch using only one hand, with the thumb pressing the 'f' key while the forefinger presses the 'j' key and a right-handed user switches into a joystick mode with one hand.

3. A computer based method employing an index finger controlled pointing device, for manipulation and control of the computer keyboard, consisting of the steps of:

employing user's sad index finger for inputting x,y coordinate data into a computer;

as said pointing device, by means of a joystick(s);

placed on top of or under specific keyboard letters;

keeping said user's hands and fingers over the home row of keys position, throughout the process;

employing a mini-joystick positioned either under or on the 'j' key of said keyboard;

employing the right index finger to press on said 'j' key, while keeping the finger positioned just over said home keys;

switching the 'j' key function from a key to an index finger pointing device without the need to move either the left or right hand fingers away from the home row keys by having said left index finger hover over the 'f' key;

and the right said index finger hovers over the 'j' key;

said left index finger hovers over said 'f' key and said right index finger hovers over the 'j' key;

using a time delay to distinguish whether the user wishes to type 'fj', 'jf' or perform a joystick mode switch, as follows:

simultaneously press the 'f' and 'j' keys;

indicate "a joystick" mode switch where said 'j' key becomes a pointer device;

and the 'f' and 'j' characteristics are to be discarded;

employing a longer duration between pressing the 'f' and 'j' keys produces the character sequence 'fj' or 'jf'.

4. The method of claim 3 further including the steps of;

employing any computer that provides under 50 millisecond time delays.

5. The method of claim 4 further including the steps of:

employing the left hand index finger for locating the joystick pointing device located on or under the 'f' key.

6. The method of claim 4 further including the steps of:

employing two joystick pointing devices, one on or under the 'f' key, and one under the 'j' key;

holding down either the 'f' or 'j' and press both;

continue to hold down either 'f' or 'j' key, and press both the 'f' and 'j' keys simultaneously, causing the 'f' of or 'j' key to become the active joystick pointing device.

7. The method of claim 6 further including the steps of:

providing said keyboard device in which the key and the joystick are removable and said user positions said joystick under the 'f' key or 'j' key;

popping off the keycap, popping out the joystick device, replacing the joystick device and replacing the keycap where appropriate, one repositionable joystick is provided.

8. The method of claim 7 further including the steps of:

employing the said key or keys that cover said joystick pointing device to perform a dual mechanical function;

hold down said key and push around said mini-joystick button, where the key is in the joystick mode;

reposition said joystick button directly over where said 'j' or 'f' key would be;

affix said keycap to the top of said joystick button, providing both key function and said joystick function; and hold down the said key.

9. A computer based method employing an index finger controlled pointing device, for manipulation and control of the computer keyboard, consisting of the steps of:

employing user's said index finger for inputting x,y coordinate data into a computer, as said pointing device, by means of a joystick(s);

placed on top of or under specific keyboard letters;

keeping said uses hands and fingers over the home row of keys position, throughout the process;

employ the left and right mouse buttons to serve as thumb buttons;

provide keyboard equipped with a mini-joystick located under the 'f' and 'j' keys;

employing the index finger controlled joystick on the home row.

10. A computer based system employing an index finger controlled pointing device for manipulation and control of the computer keyboard, consisting of:

means for using a user's said index finger as said pointing device for inputting x,y coordinate data into a computer;

by means of a joystick(s) placed on top of or under specific keyboard letters;

keeping said user's hands and fingers in place over the home row keys, throughout the process;

said mini-joystick is positioned either under or on the 'j' key of said keyboard;

the right index finger is employed to press on said 'j' key while keeping the finger positioned just over said home keys;

switching the 'j' key function from a key to said index finger pointing device without the need to move either the left or right hand fingers away from the home row of keys by having said left index finger hovers over the 'f' key and the right index finger hovers over the 'j' key;

wherein said user can invoke said mode switch using only one hand, by using the thumb pressing the 'f' key, while the forefinger presses the 'j' key; and said right-handed said user can switch into a joystick mode with one hand.

11. A computer based system employing an index finger controlled pointing device for manipulation and control of the computer keyboard, consisting of:

means for using a user's said index finger as said pointing device for inputting x,y coordinate data into a computer;

by means of a joystick(s) placed on top of or under specific keyboard letters;

keeping said user's hands and fingers in place over the home row keys, throughout the process; wherein a time delay is used to distinguish between whether the user wishes to type 'fj', 'jf' or perform "to a joystick" mode switch, employing;

means by which the user simultaneously presses the 'f' and 'j' keys within less a time, 1/10 of a second or less; and said user indicates through "a joystick " mode switch that said 'j' key becomes a pointer device, and the 'f' and 'j' characteristics are to be discarded; and a longer duration between 'f' and 'j' keys produces the character sequence 'fj' or 'jf'.

12. A computer based system employing an index finger controlled pointing device for manipulation and control of the computer keyboard, consisting of:

means for using a user's said index finger as said pointing device for inputting x,y coordinate data into a computer;

by means of a joystick(s) placed on top of or under specific keyboard letters;

keeping said user's hands and fingers in place over the home row keys, throughout the process;

said left and right mouse buttons serve as thumb buttons;

while said keyboard is equipped with a finger mini-joystick located to the left and right of said user's thumbs; and said index finger controlled joystick is on the home row.

13. A computer based method employing an index finger controlled pointing device, for manipulation and control of the computer keyboard, consisting of the steps of:

employing user's said index finger for inputting x,y coordinate data into a computer;

as said pointing device, by means of a joystick(s);

placed on top of or under specific keyboard letters;

keeping said user's hands and fingers over the home row of keys position, throughout the process;

attaining one-handed said mode switching by;

pressing 'j' and 'k' key with the index finger and middle finger of said right hand; and releasing the middle finger, using the index finger as the pointer.

14. A computer based method employing an index finger controlled pointing device, for manipulation and control of the computer keyboard, consisting of the steps of:

employing user's said index finger for inputting x,y coordinate data into a computer;

as said pointing device, by means of a joystick(s);

placed on top of or under specific keyboard letters;

keeping said user's hands and fingers over the home row of keys position, throughout the process;

attaining a one handed mode switch for left-handed users by;

pressing the 'd' and 'f' keys with the middle and the index fingers of left hand; and releasing the middle finger, using the index finger of the left hand as the pointer.

* * * * *